May 6, 1958  E. M. CUSTER  2,833,373
AIR FILTER
Filed May 13, 1954
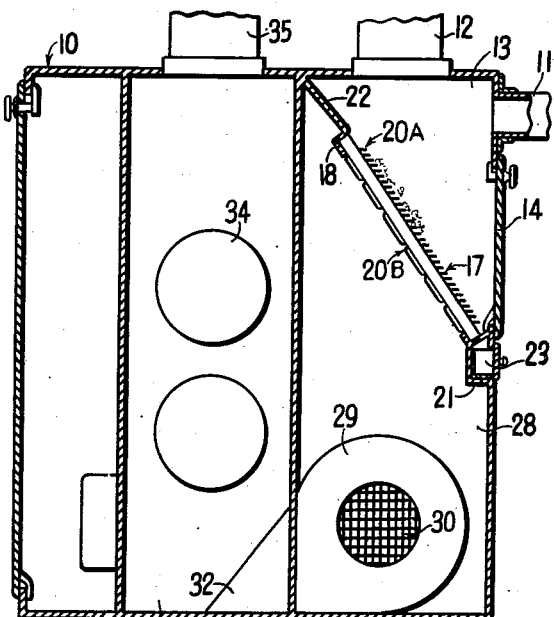
Fig. 1
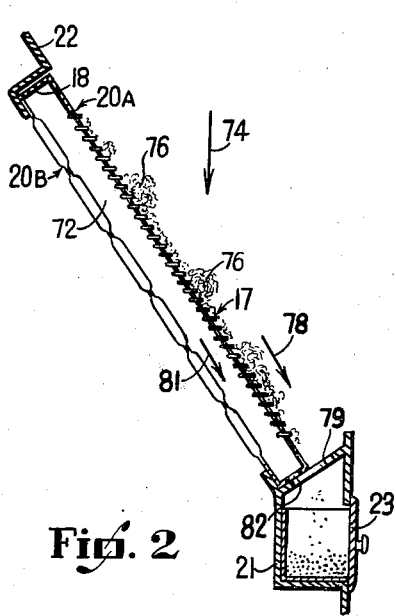
Fig. 2
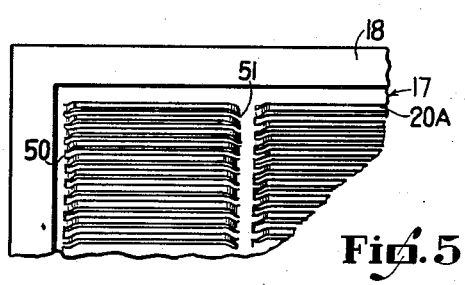
Fig. 5
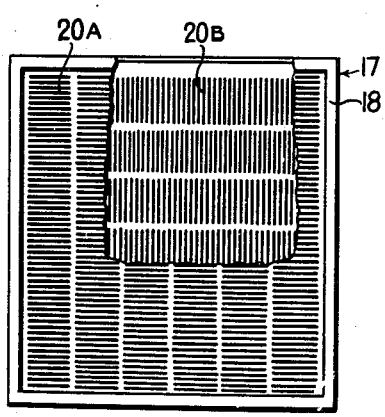
Fig. 6
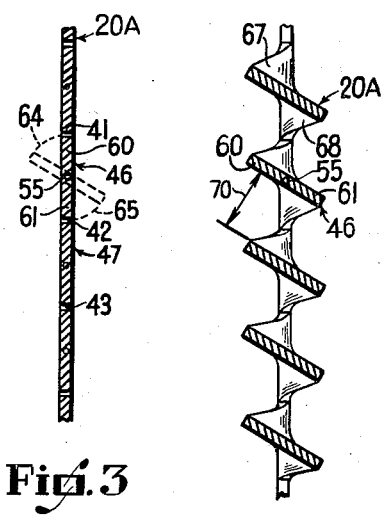
Fig. 3
Fig. 4
INVENTOR.
ELMER M. CUSTER
BY
Schmieding and Fultz
ATTORNEYS

2,833,373

AIR FILTER

Elmer M. Custer, Columbus, Ohio

Application May 13, 1954, Serial No. 429,595

1 Claim. (Cl. 183—52)

The present invention relates generally to filters and more particularly to a novel self-cleaning filter for removing dust, and the like, from the flowing air.

In the manufacture of air filters, it is common practice to produce fine porosity filter media of relatively high air cleaning capacity, but which possess relatively high resistance to the passage of air, as well as viscous coated, coarse porosity filter media of relatively low resistance to the air flow.

Although filters having fine porosity media produce an efficient straining action for removing dust particles from the air, such filters possess a disadvantage wherein the interstices of the media quickly clog. Thus clogged and loaded, this type of media causes resistance to or stoppage of the air flow, resulting in maximum power consumption in the blowers which propel the dusty air stream through the air distributing system. Whereas this type of filter has the advantage of maximum cleaning of the air because of its fine porosity, it is inefficient and has a short serviceable life.

The second mentioned conventional form of air filter of the wet or viscous media type generally comprises a stack or mat of packed sheets formed with a network of perforations constituting tortuous air passages which are excessively larger in size than the foreign particles intended to be filtered from the air. This wet-type media is treated with a suitable saturant forming a tacky media surface which is adapted to extract and arrest dust from the air by impingement. Dust particles engaging the viscous media adhere thereto and load on the surfaces and side of the stacked, wet-type sheets of such conventional media, until the surfaces of the media become dry or nonadhesive, or until the wetted dust, known as agglomerate, closes the coarse air passages of the open work media so that it no longer functions. This type of filter has the disadvantage of minimum dust arrestance and retention since a percentage of the dust fails to impinge the viscous surfaces. Moreover, the build-up of agglomerate rapidly clogs the filter or isolates the passing dust from the adhesive saturant. On the other hand, such coarse viscous media has the advantage of comparatively free air flow, due to its coarse open work passages, and hence a lower power consumption. Nevertheless, its relatively high efficiency rapidly disappears with use of the filter thus limiting the use of the filter to a relatively short serviceable life.

With the foregoing disadvantage of conventional filtering media in mind, I have invented a novel filter structure of a permanent type which will give a lifetime of service with only relatively infrequent cleaning. As a practical matter, the present filter eliminates clogging problems since it not only effectively arrests dust from the air, but also prevents the build-up of dust on the media surfaces. Although it has been necessary to remove and clean conventional filters every two or three weeks, in instances where the filter was adaptable to cleaning, in order to maintain an acceptable filtering effect, and whereas it has been necessary to replace such conventional filters every six months, the present invention provides an efficient filter which can be used indefinitely and which, on an average job, need be cleaned only every six or eight weeks. Moreover, the cleaning operation in the case of the present filter, is extremely simple as compared to conventional types.

The above mentioned advantages are achieved in a novel and inexpensive manner through the use of relatively thin sheet material, such as aluminum, which is provided with a plurality of stationary veins or baffles separated by interspaced air passages. Moreover, such pattern of baffles and air spaces throughout the area of the sheet is uniform, adapting the present filter sheet material to inexpensive production at a high volume by automatic production techniques.

I have discovered that when a plurality of filtering sheets, constructed according to the present invention, are disposed across an air stream as herein set forth, such arrangement produces an unusual and profound filtering effect upon the passing air in that larger particles of dust, and particularly lint which forms a large portion of the foreign particles collected in filtering the air of a dwelling house, will ball up, in an anomalous manner, on the upstream surface of the upstream filtering sheet in a manner whereby the collected material does not cling in or clog the openings through the filter sheet, nor will the material clog the space lying between the successively arranged sheets themselves. Moreover, I have discovered that filter sheets having alternately spaced baffles and passages, formed and arranged in the manner herein described, will also arrest minute particles of dust, other than lint, and such small particles of dust will only to a slight extent collect on the filter sheet of the present type. Such small particles of dust, which are arrested but not retained by the present filter type, will migrate downwardly parallel to the plane of the filter sheets and collect in a pile at the lower edge thereof. Hence it will be seen that a suitable receptacle can readily be provided at such lower edge for the purpose of collecting the minute particles in a readily disposable manner. Moreover, it will be seen that the larger lint-type dust, which builds up in a ball-like collection on the upstream surface of the upstream filter, is arrested and retained by the filter in a manner which produces a minimum degree of air passage obstruction for a relatively large amount of particle collection.

In order to clean the present filter, which need be done only relatively infrequently, one need only lift or dump the balled-up lint from the upstream surface of the upstream filter, and then wash or wipe the surfaces of the baffles to remove a relatively small amount of fine dust particles deposited thereon. Tests of the present filter show that even after six or eight weeks of continuous use on an average job, at which time it is desirable to clean the present filter, the efficiency of such filter will not yet have become materially impaired since the air passages will still be relatively clear of dust such that the power required at the blowers is not excessive, as would be the case were the blowers operating with a clogged conventional type of filter.

It is therefore an object of the present invention to provide a permanent air filter which need not be replaced and which requires only infrequent cleaning.

It is another object of the present invention to provide a filter which removes a relatively high portion of both the lint and fine dust from flow air, as compared with conventional filters of the large air space type, but which will retain its initial high degree of efficiency for much longer periods of service than will such conventional filters.

It is another object of the present invention to provide a filter which possesses an anomalous characteristic of collecting lint-type foreign material in a ball-like formation whereby a relatively small amount of air passage obstruction is produced for a relatively large amount of foreign material collected.

It is still another object of the present invention to provide a filter of the type described which will effectively arrest and remove from the air a large portion of the fine dust particles, with the surfaces of such filter being subjected to a build up of only a small portion of the particles arrested by the filter, the balance of the collected particles being caused to migrate downwardly to form a pile at a position wherein such particles will not obstruct the air passages of the filter.

It is still another object of the present invention to provide an air filter comprising a plurality of spaced sheets, with each of said sheets being formed with a plurality of alternately spaced, stationary baffles and passages, such baffles and passages being of a form amenable to continuous automatic production from flat sheet material.

Other objects and advantages of the present invention will be apparent from the following description, reference being had to the accompanying drawings wherein a preferred form of embodiment of the invention is clearly shown.

In the drawings:

Figure 1 is a partial sectional view of a furnace showing the present filter installed therein, with the section being taken substantially along a vertical plane extending from the front to the rear of the furnace;

Figure 2 is a side sectional view of a filter constructed according to the present invention, with the section being taken along the vertical plane extending longitudinally through the filter;

Figure 3 is a partial side sectional view showing the filter sheet material of the present invention at a stage in the formation thereof, with the section being taken along a plane perpendicular to the plane of the sheet of the material;

Figure 4 is a partial side sectional view corresponding to Figure 3 showing the sheet material after it has been formed according to the present invention;

Figure 5 is a partial front elevational view of the filter of the present invention; and Figure 6 is a front elevational view, partially broken, showing an arrangement of a plurality of adjacently positioned filtering sheets which are formed according to the present invention.

Referring to Figure 1 in the drawings, a furnace is indicated generally at 10 and is provided with an air intake duct 11 for bringing in air from the exterior of the building. An air return duct 12 is also provided with both of said ducts 11 and 12 leading into a compartment 13. Compartment 13 includes a door 14 which provides access to a filter indicated generally at 17. Filter 17 includes a rigid peripheral frame 18 which supports a plurality of filter sheets, such as 20A, each of which sheets is formed in a manner later to be described.

Filter 17 is mounted in the compartment 13 by means of a suitable frame including a bottom member 21 and a top member 22. Adjacent to the bottom supporting member 21, a receptacle 23 may be provided for receiving and retaining particles which are removed from the flowing air by the filter.

The furnace 10 further includes a compartment 28 located downstream from the filter 17 relative to the flow of air through the filter. A blower 29 is mounted in the lower portion of the compartment 28 with such blower having an air intake opening 30 and an air discharge opening 32 for discharging air into a compartment 33. Hence, it is seen that the blower 29 serves to draw air from the conduits 11 and 12, into compartment 13, and next through the filter 17 and into compartment 28. The filtered air is then moved upwardly through compartment 33, where such air is heated by heating elements 34. After the air passes over the heating elements 34, it is distributed to various portions of the building by means of conduit 35.

Reference is next made to Figures 3 and 4 which show an enlarged cross section of a filter sheet, such as sheets 20A and 20B, formed according to the present invention. The filter sheet is formed of relatively thin sheet stock, such as aluminum, by producing a plurality of spaced slits or cuts indicated generally at 41, 42, and 43. In forming the narrow cuts, a plurality of metal strips are formed in parallel and coextensive relationship with the cuts, with the ends thereof terminating at the parallely spaced flat sheet portions 50 and 51 as best seen in Figure 5.

Referring next to Figure 4, it will be seen that the typical strip 46 is formed into a baffle by twisting such strip about an axis 55, with the axis of twist for such strip extending longitudinally thereof between an upper strip portion 60 and a lower strip portion 61. In twisting the strip 46 to the baffle-forming position of Figure 4, the upper strip portion 60 is displaced away from the plane of the sheet along the arc 64, and the lower strip portion 61 is similarly displaced along the arc 65. In twisting a strip from the configuration of Figure 3 to the baffle-forming configuration of Figure 4, each end of such strip will form curved junctions 67 and 68 with the flat sheet portions 50 and 51. In addition, in twisting the strips into the baffle-forming configuration, the narrow cuts, such as 42, are opened into air passages of substantial width as indicated at 70 in Figure 4.

Referring next to Figure 2, the filter 17 illustrates an arrangement of two filter sheets, of the type just described, disposed in parallel arrangement and including the upstream sheet 20A and a downstream sheet 20B separated by an air space 72. The baffles of the upstream sheet 20A are disposed in horizontally extending disposition and the baffles of the downstream sheet 20B are disposed in vertically extending disposition. The baffles of the respective sheets, however, can be disposed in various other relative directions of extension without departing from the spirit of this invention.

With continued reference to Figure 2, the unfiltered air moving downwardly along the path of the arrow 74 will strike the baffles of the upstream sheet 20A and pass through the air space therebetween. The air will then pass into the compartment 72 under deflecting action by the baffles of the upstream sheet. The deflected air will then engage the baffles in the downstream plate 20B which, in turn, produces further deflecting action on the air. With the presence of such deflecting action, I have discovered that relatively large particles of lint carried by the air will collect on the upstream side of the upstream sheet 20A in ball-like formation as indicated at 76. Moreover, fine dust-like particles, which are arrested at the upstream side of filter sheet 20A, will move downwardly along the direction of arrow 78 and through the opening 79 to the receptacle 23. In a similar manner, other fine particles of dust which pass through sheet 20A but are arrested in the compartment 72, will move downwardly in the compartment in the direction of the arrow 81 and pass through the opening 82 and into the receptacle 23. Just why the present filter performs in the above described manner is not understood with certainty, but it is believed that the deflecting action of the baffles produces an agitating and swirling action on the air in the vicinity of the filter such that the lint-like particles are caused to contact and associate into the ball-like entanglements as indicated at 76 in Figure 2. Moreover, it is believed that the relatively fine particles are retained by the presence of swirling air at the upstream side of the sheet 20A and in the space 72 between the sheets, with such particles working downwardly in an erratic, swirling manner and finally coming to rest at the base of the filter.

In order to achieve the above described filter effect, it has been found necessary to use at least two sheets of the filter sheet type of the present invention, whereas the extension of only one of said sheets across a flowing air stream has only a slight filtering effect. The use of two of such sheets in adjacent disposition produces a profound increase in the filter efficiency.

In summary, it will be seen that the present invention provides a filter which arrests and removes lint and fine particles from a stream of flowing air in a novel manner. Moreover, novel filter sheet structure, although simple and inexpensive to produce, eliminates the clogging and cleaning problem encountered in the use of conventional filters. As a consequence, the present filter need be cleaned at only relatively infrequent intervals with the cleaning operation being relatively simple.

While the form of embodiment of the present invention as herein disclosed constitutes a preferred form it is to be understood that other forms might be adopted, all coming within the scope of the claim which follows:

I claim:

A non-clogging dry filter for positioning in an opening lying in a plane inclined with respect to the normal vertical plane for removing particles from flowing air comprising at least two sheets in superposed spaced relationship to one another, frame means for supporting said sheets in inclined relationship to intercept all of the flow of air, said sheets being inclined at an angle with respect to the vertical such that particles collecting on said sheets will progress downwardly thereon by means of gravity, the first sheet having a plurality of baffles and passages alternately disposed across the surface thereof and disposed in horizontally extending disposition, the second sheet having a plurality of baffles and passages alternately disposed across the surface thereof and disposed in vertically extending disposition, each of said baffles of said sheets being formed of a strip of said sheet, said strip having two substantially parallel edges and lying between spaced coextensive slits through said sheet, each of said slits having two substantially parallel sides, and the plane of each of said strips being disposed transversely to the plane of the sheet to form said baffles such that a portion of each baffle extends from one side of the plane of the sheet and the other portion of said baffle extends from the other side of the plane of the sheet, said inclination of the strips also serving to form said passages of substantially rectangular cross-section, and particle collecting means disposed at the bottom of said plurality of sheets for receiving particles arrested from said flow that progress downwardly along said sheets by the action of gravity.

References Cited in the file of this patent

UNITED STATES PATENTS

| | | |
|---|---|---|
| 2,357,734 | Haber | Sept. 5, 1944 |
| 2,493,726 | O'Day | Jan. 3, 1950 |
| 2,506,273 | Linderoth | May 2, 1950 |

FOREIGN PATENTS

| | | |
|---|---|---|
| 136,563 | Sweden | July 15, 1952 |
| 284,790 | Switzerland | Dec. 1, 1952 |